US007428552B2

(12) United States Patent
Muenkel

(10) Patent No.: US 7,428,552 B2
(45) Date of Patent: Sep. 23, 2008

(54) FLEXIBLE ACCESS TO METAMODELS, METADATA, AND OTHER PROGRAM RESOURCES

(75) Inventor: Christian Muenkel, Schriesheim (DE)

(73) Assignee: SAP Aktiengesellschaft, Walldorf (DE)

( * ) Notice: Subject to any disclaimer, the term of this patent is extended or adjusted under 35 U.S.C. 154(b) by 375 days.

(21) Appl. No.: 10/888,074

(22) Filed: Jul. 9, 2004

(65) Prior Publication Data

US 2006/0010161 A1    Jan. 12, 2006

(51) Int. Cl.
G06F 7/00 (2006.01)
G06F 17/00 (2006.01)

(52) U.S. Cl. .................................. 707/103 X
(58) Field of Classification Search ......... 707/100–103, 707/2, 10, 103 R, 103 Y, 103 X, 103 Z
See application file for complete search history.

(56) References Cited

U.S. PATENT DOCUMENTS

| 6,721,747 | B2* | 4/2004 | Lipkin ........................ 707/10 |
| 6,775,680 | B2* | 8/2004 | Ehrman et al. .............. 707/102 |
| 6,999,956 | B2* | 2/2006 | Mullins ........................ 707/2 |
| 2002/0165995 | A1* | 11/2002 | Matula et al. ............... 709/316 |
| 2003/0233365 | A1* | 12/2003 | Schmit et al. ............... 707/100 |
| 2005/0144276 | A1* | 6/2005 | Bird et al. .................... 709/225 |

* cited by examiner

*Primary Examiner*—Hung Tran Vy
(74) *Attorney, Agent, or Firm*—Mintz, Levin, Cohn, Ferris, Glovsky & Popeo, P.C.

(57) ABSTRACT

A system and method for enabling a Meta Object Facility (MOF) and a Java Metadata Interface (JMI) compliant service to access program resources. A system includes a metamodel repository and an application server. The metamodel repository is configured to store the program resources including metadata and one or more metamodels. The application server includes at least one application providing a first portion of the program resources. A first portion of the program resources are stored in a database associated with the application server. A second portion of the program resources are provided in at least one application of the application server, and programming language instances of the program resources are received by one or more applications independent of where the program resources are stored or provided.

10 Claims, 4 Drawing Sheets

FLEXIBLE ACCESS TO METAMODELS, METADATA, AND OTHER PROGRAM RESOURCES

BACKGROUND

This document relates to access to metamodels, metadata and other program resources. More particularly, this document describes systems and methods for accessing these resources from applications as well as from a repository in a server.

Metadata, in particular the exchange of metadata and its programmatic access through application programming interfaces (APIs), plays a central role in almost any software product. Metadata defines the structure and meaning of data objects and is used by applications to define, relate and manipulate those objects. A metamodel describes the structure of the metadata. In order to make software products more interoperable, a general trend is to base the access, exchange, and structure of metadata on common standards, i.e. common access APIs, common interchange formats and common metamodels.

The Meta Object Facility (MOF) standard, promulgated by the Object Management Group (OMG) defines a language to describe metamodels and how to handle associated metadata. The Java Metadata Interface (JMI) standard, defined by the JCP process) brings the metamodel definition to the Java world. It describes a set of generic interfaces to access metamodels and metadata, as well as how Java interfaces should be generated according to a metamodel. Moreover, it defines the behavior of classes implementing theses interfaces. A Metamodel Repository (MMR) is an implementation of a MOF, and is a JMI-compliant repository handling metamodels, metadata and other program resources.

When multiple applications access the same repository, an issue arises regarding the storage and deployment of metamodels, metadata and other program resources, especially in a shared-resource environment. The required resources may be contained in some applications, but other metadata resources may be deployed separately, within the repository, the server or even in other applications.

SUMMARY

This document discloses systems and methods for implementing a metamodel repository, which provides access to metamodels, metadata and other program resources required by applications in a server environment, independent of the deployment and storage of those resources. This document also discloses a mechanism for accessing such resources delivered by the applications but which are not stored in the repository.

In one embodiment, a system for enabling a Meta Object Facility (MOF) and a Java Metadata Interface (JMI) compliant service to access program resources includes a metamodel repository and an application server. The metamodel repository is configured to store the program resources including metadata and one or more metamodels. The application server includes at least one application providing a first portion of the program resources.

In another embodiment, a method of accessing program resources in a Meta Object Facility (MOF) using a Java Metadata Interface (JMI) compliant service includes a step of storing a first portion of the program resources in a database associated with an application server. In the embodiment, the method further includes the steps of providing a second portion of the program resources in at least one application of the application server, and receiving programming language instances of the program resources by one or more applications independent of where the program resources are stored or provided.

The details of one or more embodiments are set forth in the accompanying drawings and the description below. Other features, objects, and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

In an enterprise application environment compliant with Meta Object Facility (MOF) and Java Metadata Interface (JMI) a service is provided for accessing metamodels and associated metadata. The service includes a repository storing one or more metamodels, metadata and other program resources such as Java class files. The repository is accessible by applications in the enterprise application environment. The repository also provides access to the same resources during the instantiation of requested metadata. Those resources, however, may not be deployed with and stored in the repository but may be part of an application. Thus, a design pattern for accessing those resources is also disclosed.

Figure 1:
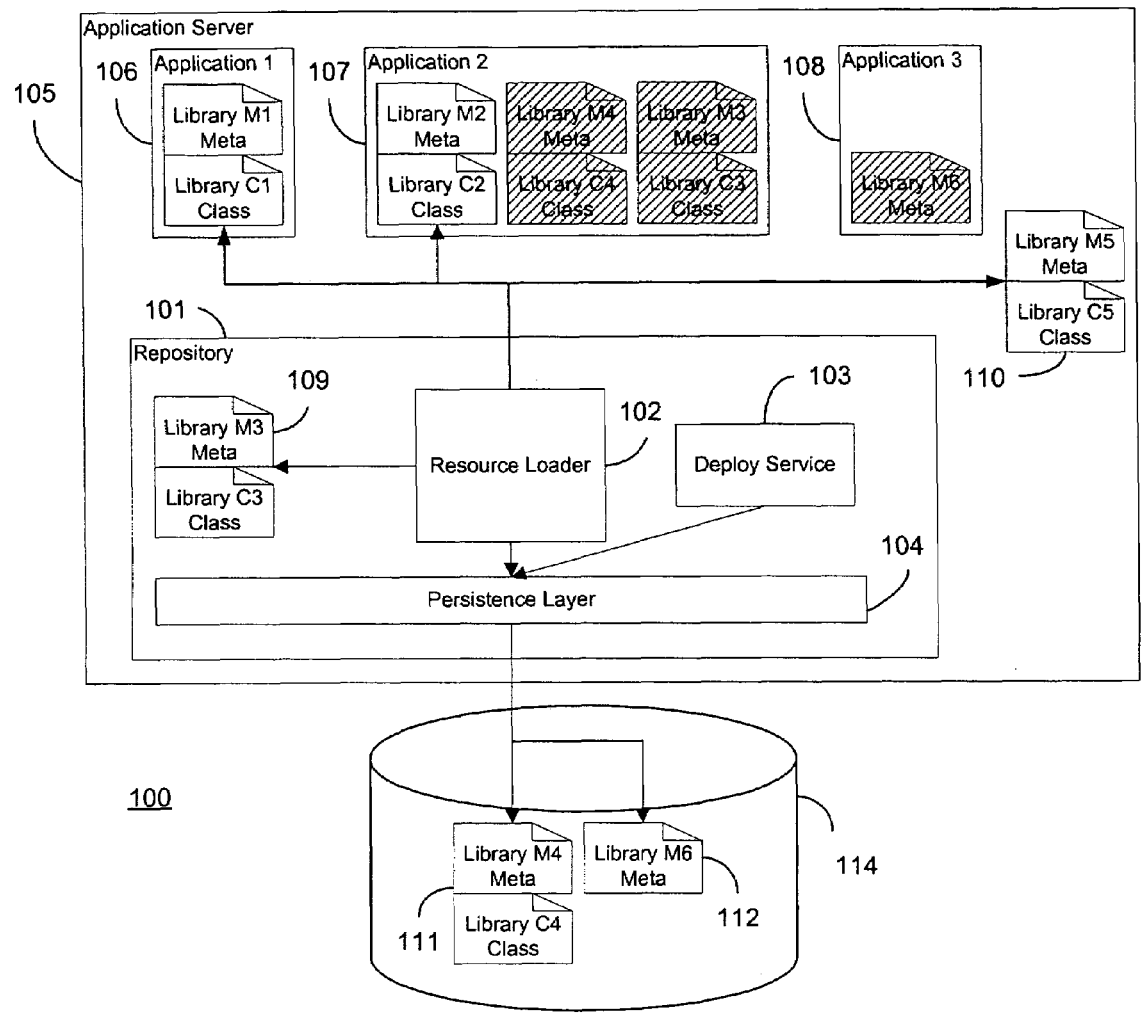
FIG. 1 is block diagram of a system for implementing flexible access to metamodels, metadata and other program resources in a repository.

FIG. 1 shows a system 100 having a metamodel repository (MMR) 101 including a resource loader 102, a deployment service 103, and a persistence layer 104. The persistence layer 104 provides access to a database 114, which is connected to an application server 105. The application server 105 hosts the MMR 101 and applications "Application 1," "Application 2" and "Application 3," designated hereafter primarily as applications 106, 107 and 108. Any number of applications may be hosted in the application server 105. The MMR 101 and the applications 106, 107 and 108 are separate units within the application server 105, i.e. they may run in separate threads and need not share the same path to resources, e.g. the same class path in the J2EE environment.

Metamodels, metadata and other program resources are encapsulated into libraries, which are stored in different places. In the MMR 101, the metamodels and metadata are stored in Java libraries (JAR archives). Java classes generated by the MMR 101 according to the JMI standard and its respective metamodel are stored in separate Java libraries.

The application server 105 includes various processes to provide metamodel, metadata and program resource libraries. For example, the metamodel and metadata library "library M1" and its corresponding class library "library C1" are part of application 106. These libraries are deployed with their respective applications and not stored in the MMR 101. Instead, the application server 105 controls access to these libraries. While the application (106) has direct access to these libraries as provided by the application server 105, the MMR 101 may run in a different thread or memory space without direct access.

The application 107 contains the metamodel and metadata library "library M2" and its corresponding class library "library C2". It also accesses the libraries M3, C3, M4 and M4. The metamodel and metadata libraries M3 and C3 are part of the MMR 101, and access is controlled by the application server 105. Libraries M4 and C4 (111) however are stored in the database 114 and access is controlled by the MMR 101 using the resource loader 102 and the persistence layer 104, both of which are deployed in the application server 105. The MMR's deployment service 103 receives these libraries and stores them in the database 114. Libraries M5 and C5 are provided by the application server 105. Finally, library M6 (112) is also deployed in the MMR 101 using the deployment service 103 and stored in the database 114. However, no corresponding class library C6, which includes JMI-compatible generated interfaces and classes of the metamodel in C6, is available. The MMR 101 uses generic implementations to make the read metadata available to programs.

Applications have direct access to their respective program resources. In the Java context, an application's class loader provided by the application server 105 is used to read class data of the application. Hence, "Application 1" 106 has direct access to the classes in "Library C1". The repository however, which runs in a separated thread or memory space, does not have access to that library using its class loader. The "Application 1" 106 requires the MMR 101 to access the metamodels and metadata in it's "Library M1". This is explained further below.

Figure 2:
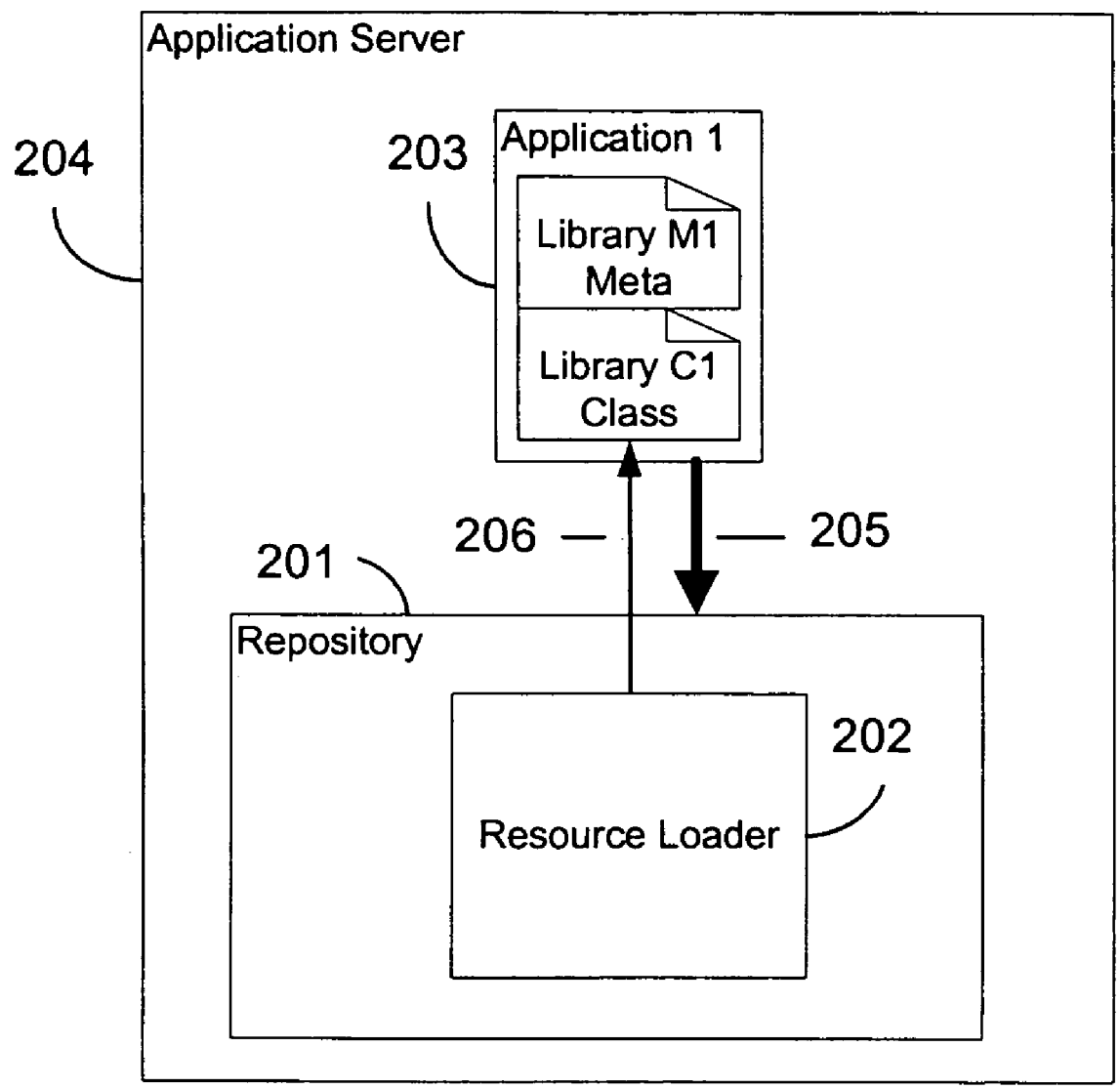
FIG. 2 is a functional block diagram illustrating access to metamodels, metadata and other program resources hosted by the application.

FIG. 2 shows the relevant subset of FIG. 1 for an application "Application 1" 203, which includes metamodels and metadata in library "Library M1" and other program resources in "Library C1". The application 203 calls (205) the repository 201 to receive some metadata of its metamodel. The repository 201 uses its resource loader 202 to read the metadata in "Library M1". The repository 201 instantiates the corresponding program resources (classes in the Java context). During this instantiation, the resource loader 202 accesses the data in "Library C1" (206). In the Java context this is done by calling the thread class loader of the application server 204, which has access to the libraries of application 203.

Figure 3:
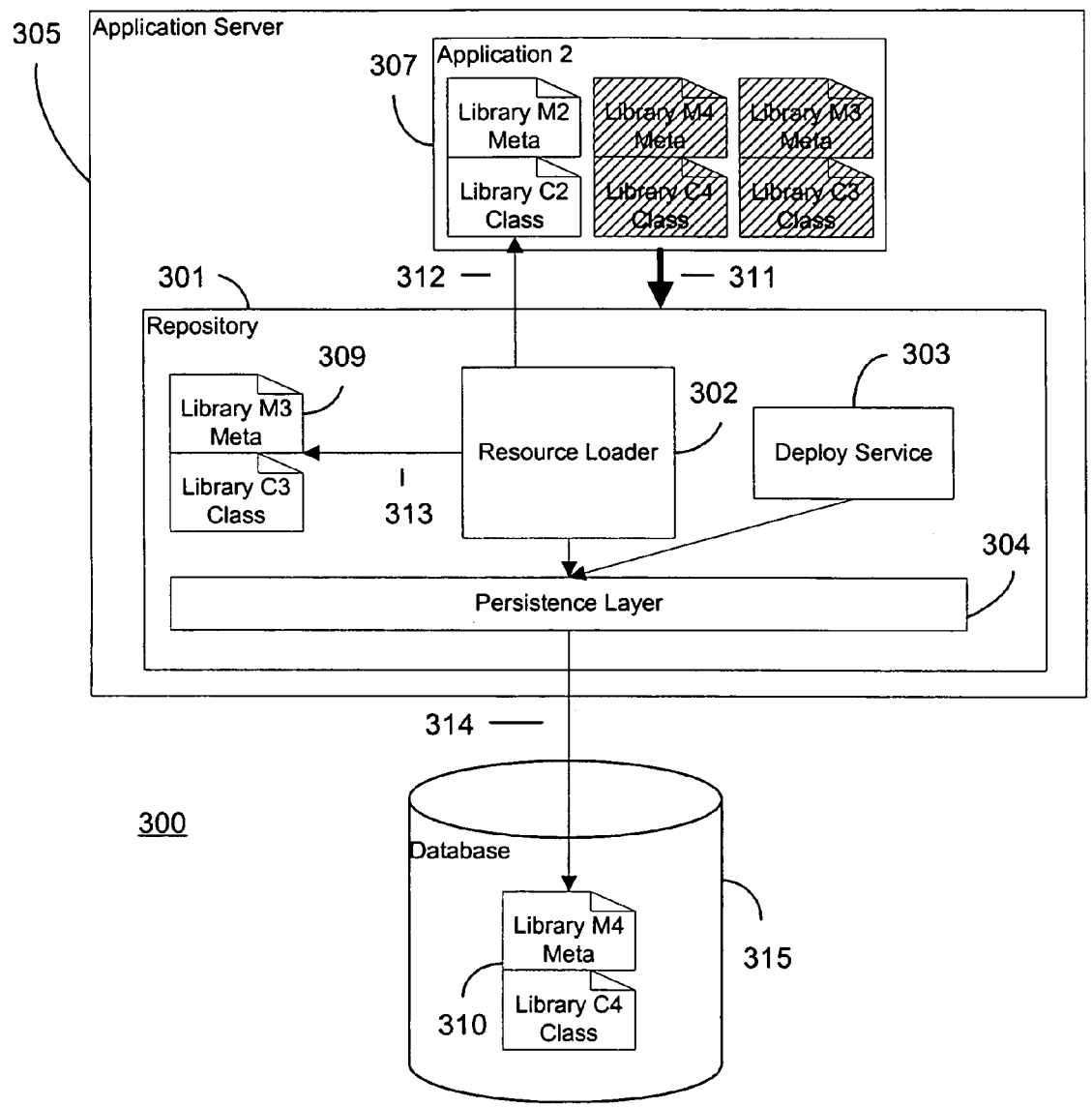
FIG. 3 is a functional block diagram illustrating access in to metamodels, metadata and other program resources hosted by the application and the repository.

FIG. 3 shows the relevant subset of FIG. 1 in case of an application "Application 2" 307, which has the libraries "Library M2" and "Library C2" in the same way as described in the last section and shown in FIG. 2, but also needs access to libraries 309 and 310 in the repository 301. Libraries 309 are part of the repository 301 and controlled by the server. Libraries 310 are controlled by the repository 301 and stored in a database 315. The application "Application 2" 307 calls (311) the repository 301 to receive some metadata. Then, the repository 301 searches (312) the libraries in the application "Application 2" 307, its own libraries 309 (313), and libraries in the database 315 (314). The instances are created using found metadata and program resources (class files).

Figure 4:
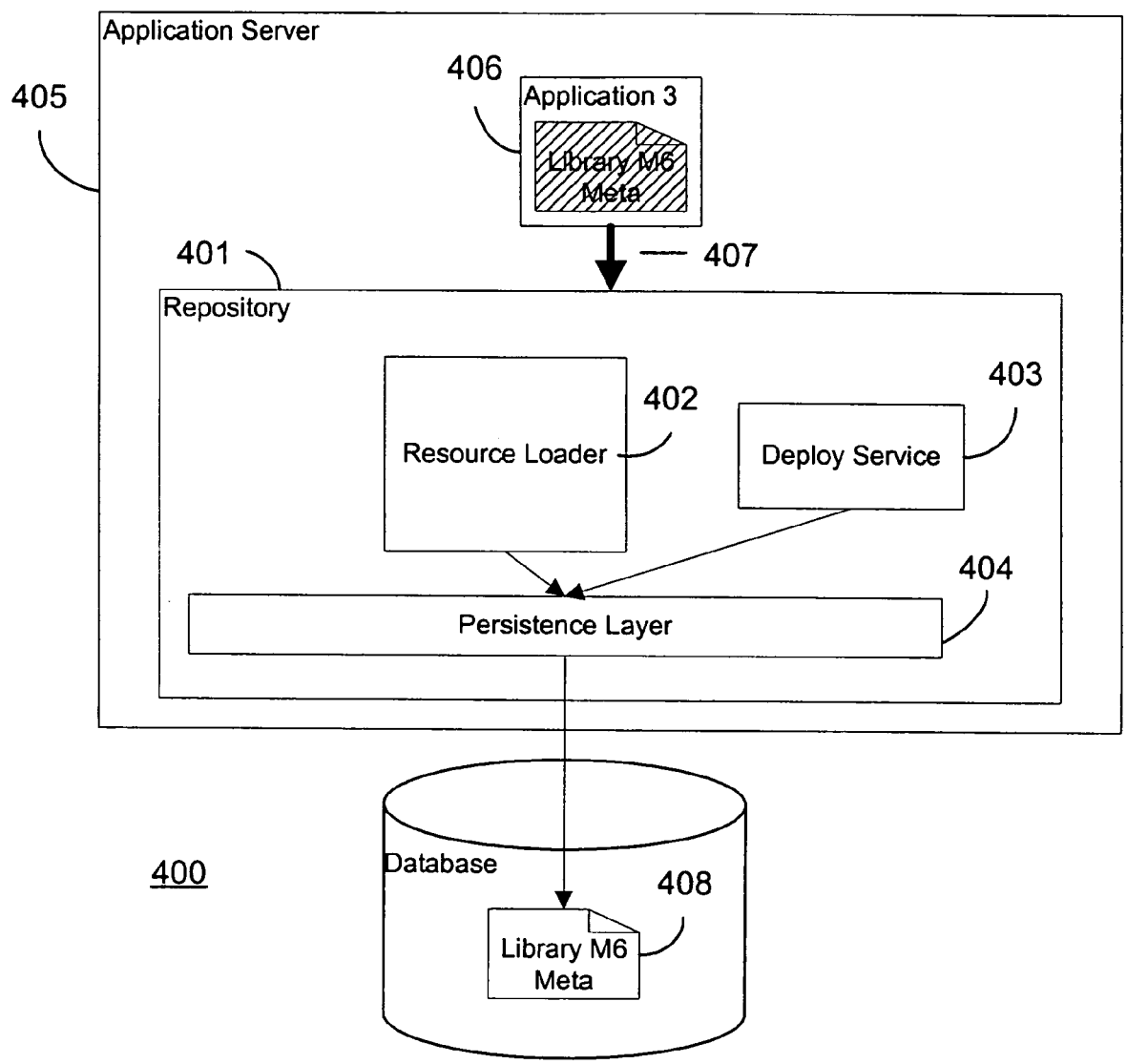
FIG. 4 is a block diagram showing a generic application with a generic access to metamodels and metadata.

FIG. 4 shows the relevant subset of FIG. 1 in the case of an application "Application 3" 406 which owns no libraries at all. It is a generic application, which accesses the metadata through generic interfaces as, for example, defined by the JMI standard. When the application "Application 3" 406 calls (407) the repository 401 to receive some metadata, the resource loader 402 of the repository 401 searches for libraries as described above. It finds a library "Library M6" 408 in its database, which contains metamodels and metadata. The repository 401 instantiates then generic implementations, which can be generic implementations of the JMI standard interfaces for example. The application 406 receives the metadata as instances of the generic implementations, and accesses the metadata through the generic interfaces.

Although a few embodiments have been described in detail above, other modifications are possible. Other embodiments may be within the scope of the following claims.

The invention claimed is:

1. A system for enabling a Meta Object Facility (MOF) and a Java Metadata Interface (JMI) compliant service to access program resources, comprising:

a metamodel repository storing the program resources including one or more Java class files, metadata and one or more metamodels, the metamodel repository including a resource loader for loading the program resources; and a processor and a memory including code, wherein the processor and the memory are configured to provide an application server including at least one application operating on a thread separate than another thread for the metamodel repository, the at least one application providing to the resource loader a first portion of the program resources including at least one of a Java class file, when the at least one Java class file is not present in the metamodel repository.

2. A system in accordance with claim 1, further comprising a database accessible by the metamodel repository and storing a second portion of the program resources.

3. A system in accordance with claim 2, further comprising a deployment service for receiving the second portion of program resources and storing the second portion of program resources in the database.

4. A system in accordance with claim 1, wherein the resource loader accesses program resources stored in the metamodel repository, in the at least one application, and in a database.

5. A system in accordance with claim 4, wherein the metamodel repository further includes a persistence layer connected between the resource loader and the database.

6. A system for enabling a Meta Object Facility (MOF) and a Java Metadata Interface (JMI) compliant service to access program resources, comprising:

a processor and a memory including code, wherein the processor and the memory are configured to provide an application server including a metamodel repository storing the program resources including one or more Java class files, metadata, and one or more metamodels, and including two or more applications, wherein at least one application provides a first portion of the program resources, the at least one application operating on a thread separate than another thread for the metamodel repository, the metamodel repository including a resource loader for loading the program resources, the at least one application providing to the resource loader the first portion of the program resources including at least one of a Java class file, when the at least one Java class file is not present in the metamodel repository; and a database, accessible by the repository via a persistence layer, and storing a second portion of the program resources.

7. A system in accordance with claim 6, wherein the metamodel repository includes a resource loader for accessing program resources from the metamodel repository, the at least one application, and the database.

8. A system in accordance with claim 6, wherein the metadata and one or more metamodels include one or more metadata libraries.

9. A system in accordance with claim 8, wherein the metadata and one or more metamodels include one or more Java class libraries.

10. A system in accordance with claim 9, wherein at least one Java class library is associated with a metadata library.

* * * * *